United States Patent

[11] 3,537,423

| [72] | Inventor | Glenn H. Burden |
| | | 1313 Fair, Gainesville, Texas 76240 |
| [21] | Appl. No. | 781,431 |
| [22] | Filed | Dec. 5, 1968 |
| [45] | Patented | Nov. 3, 1970 |

[54] AUTOMATED CAR WASHING, RINSING AND WAXING APPARATUS
10 Claims, 10 Drawing Figs.

[52] U.S. Cl. .................................................. 118/2,
118/9, 118/73, 118/316, 118/323, 134/45
[51] Int. Cl. ...................................................... B05c 5/00,
B05c 11/10
[50] Field of Search .......................................... 118/323,
9, 2, 73, 316, 323; 134/45, 123; 15/(Inquired)

[56] References Cited
UNITED STATES PATENTS
| 3,400,727 | 9/1968 | Daum et al. ................ | 134/123X |
| 3,421,526 | 1/1969 | Alkire et al. ................ | 134/123X |

*Primary Examiner*—John P. McIntosh
*Attorney*—Wayland D. Keith

ABSTRACT: A car washing, rinsing and waxing apparatus, which is normally coin operated and programmed to drive a power unit about an overhead, closed loop track in successive cycles to direct a cleaning solution, such as detergent mixed with warm water, onto a car for a predetermined number of cycles, rinse the car for a predetermined number of cycles with clean water, and selectively direct a solution containing wax onto the car, and a low surface tension rinse solution to cause the car to dry quickly and leave a wax coating thereon. Provision is made to wash the top of the car twice each cycle of operation, and to wash the sides of the car each cycle of operation and to wash the wheels for a predetermined time.

Patented Nov. 3, 1970

3,537,423

GLENN H. BURDEN
INVENTOR

BY

Wayland D. Keith
HIS AGENT

GLENN H. BURDEN
INVENTOR

BY
Wayland D. Keith
HIS AGENT

GLENN H. BURDEN
INVENTOR

BY

Wayland D. Keith
HIS AGENT

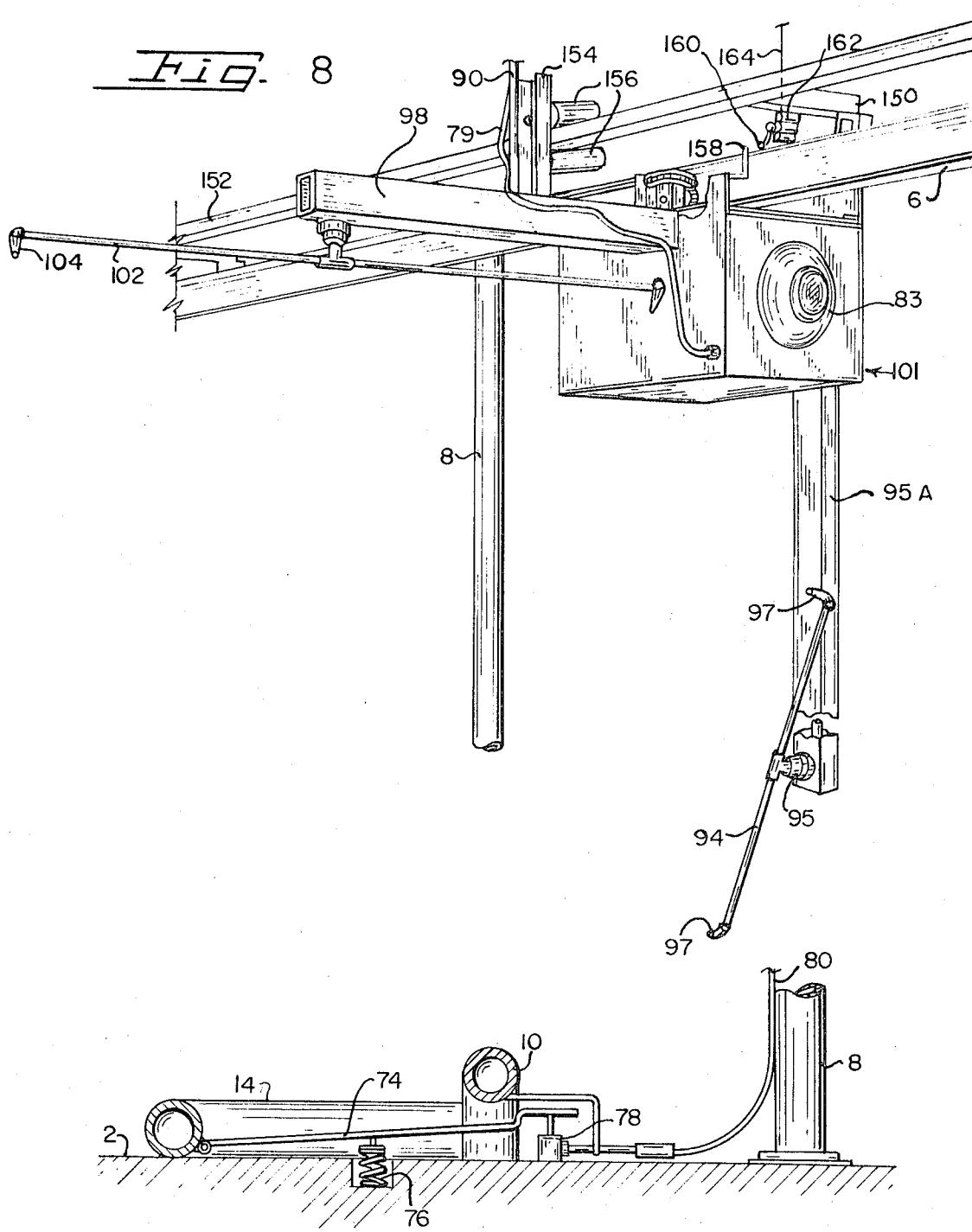

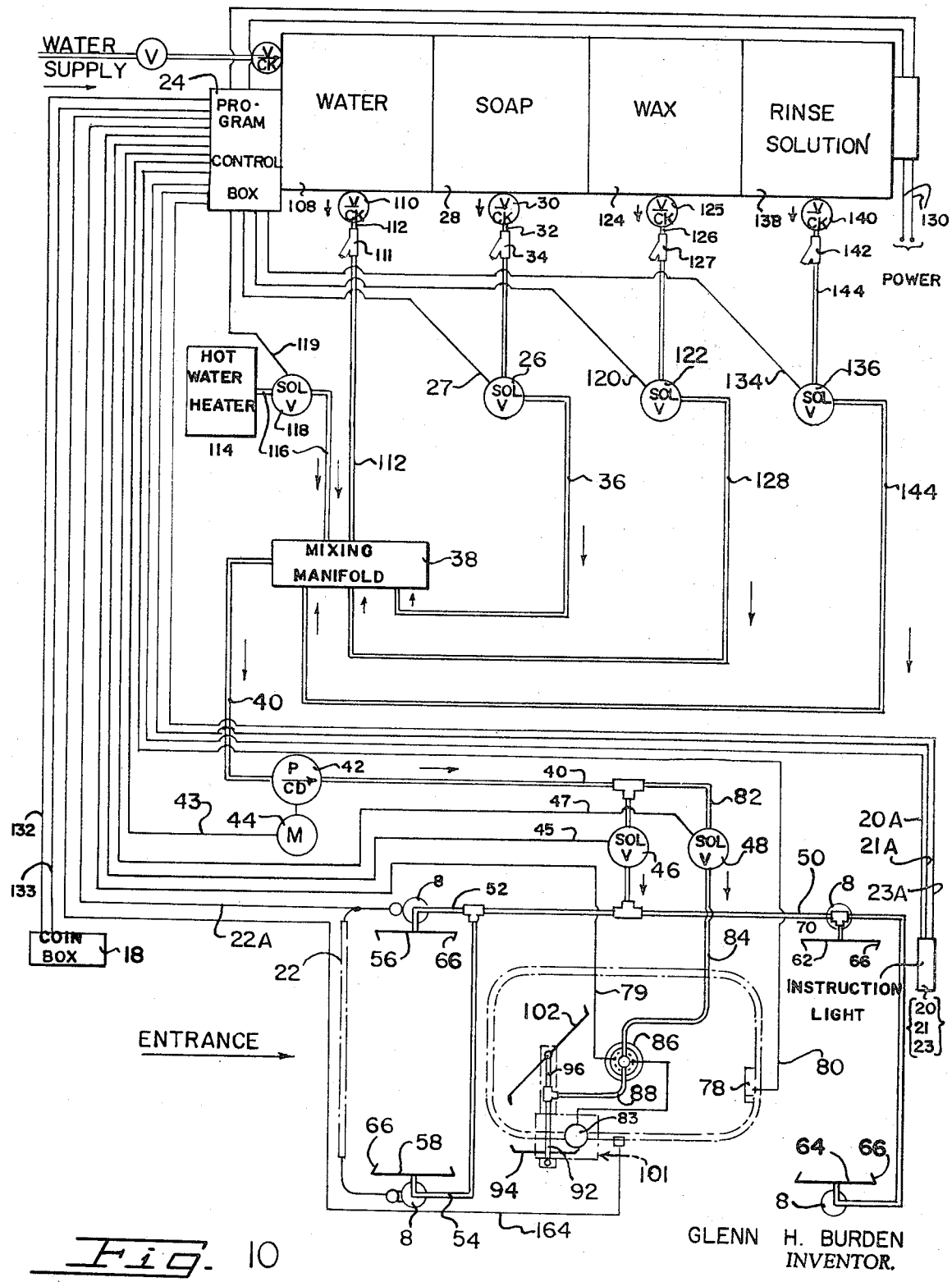

AUTOMATED CAR WASHING, RINSING AND WAXING APPARATUS

This invention relates to car washing devices and more particularly to an automated car washing device for self-service automobile laundries, whereby, normally, the switch to start the operation of the device is coin operated, and while the coin operated feature is desirable, it is to be pointed out that the present automobile laundry may employ the use of a manually or a remotely controlled switch to activate the apparatus to perform the various cycles of washing, rinsing, waxing, and the like.

Various coin operated automobile laundry systems have been proposed heretofore, these, in many instances, involved complex mechanisms and the saving effected by automation was frequently nullified by the greater cost of machinery, installation, operation and maintenance of the systems.

The present apparatus is so constructed that it can be installed at a nominal cost, wherever electrical, water and drainage facilities are available. The rapidity of operation of the present motor vehicle washing apparatus is such that the apparatus may be timed to complete the washing operation in from two to five minutes with the use of a minimum amount of water and electricity, with the attendant expense maintained at a minimum, to see that the proper water temperature is had and that the detergent, wax and the like is supplied. In fact, one attendant may have a route of many car washing devices, as it is necessary only to check each apparatus periodically for supplies, and to remove the coins from the coin actuated switch mechanism.

The present apparatus is so constructed that, after dropping one or more coins in a coin activated switch mechanism to activate the system, a motor vehicle may be driven into position and the washing will take place by stages, first to initially wash the motor vehicle with high pressure warm water and detergent, which is directed to the top, sides and wheels of the motor vehicle to remove mud, grease and road film, down to the natural finish. The motor vehicle is then rinsed with clean water until it is free of detergent, and if sufficient coins have been initially deposited, a quick drying rinse solution and wax is directed onto the motor vehicle on the last cycle. Whereupon, when the mechanism of the apparatus has performed a predetermined number of cycles, the apparatus moves to a predetermined position and stops, then, upon completion of the last cycle, an information light will indicate "exit". Upon exiting of the motor vehicle, the programming switch will clear the units for use by subsequent vehicles.

An object of this invention is to provide an electrically propelled motor vehicle washing mechanism which will travel a predetermined number of circuitous paths around a motor vehicle to direct cleansing agents to the top and sides thereof to perform the various steps of washing, rinsing and waxing the motor vehicle.

Another object of the invention is to provide an automated drive-through motor vehicle laundry whereby the mechanism may be activated, when the vehicle is in proper position, to direct the water, or water with a cleansing agent, in a circuitous path about the vehicle, to perform the predetermined number of cycles and to stop at a preselected place for subsequent motor vehicles to pass through, for washing, rinsing, and waxing in a short interval of time.

Still another object of the invention is to provide an elevated track comprising a closed, modified rectilinear loop for a washing apparatus to travel therealong to direct water and solution from whirling sprays onto the surface of the motor vehicle.

Yet another object of the invention is to provide an automated vehicle laundry for motor vehicles, which will provide an activation station, a sequential switching arrangement to program the functions to take place as the motor vehicle moves into and out of the vehicle laundry.

Still a further object of the invention is to provide an automated motor vehicle washing, rinsing and waxing apparatus which is simply in construction, easy to install, effective in operation and which requires a minimum of attendance and upkeep.

With these objects in mind and others which will become apparent as the description proceeds, reference is to be had to the accompanying drawings in which like reference characters designate like parts in the several views thereof, in which.

Figure 1:
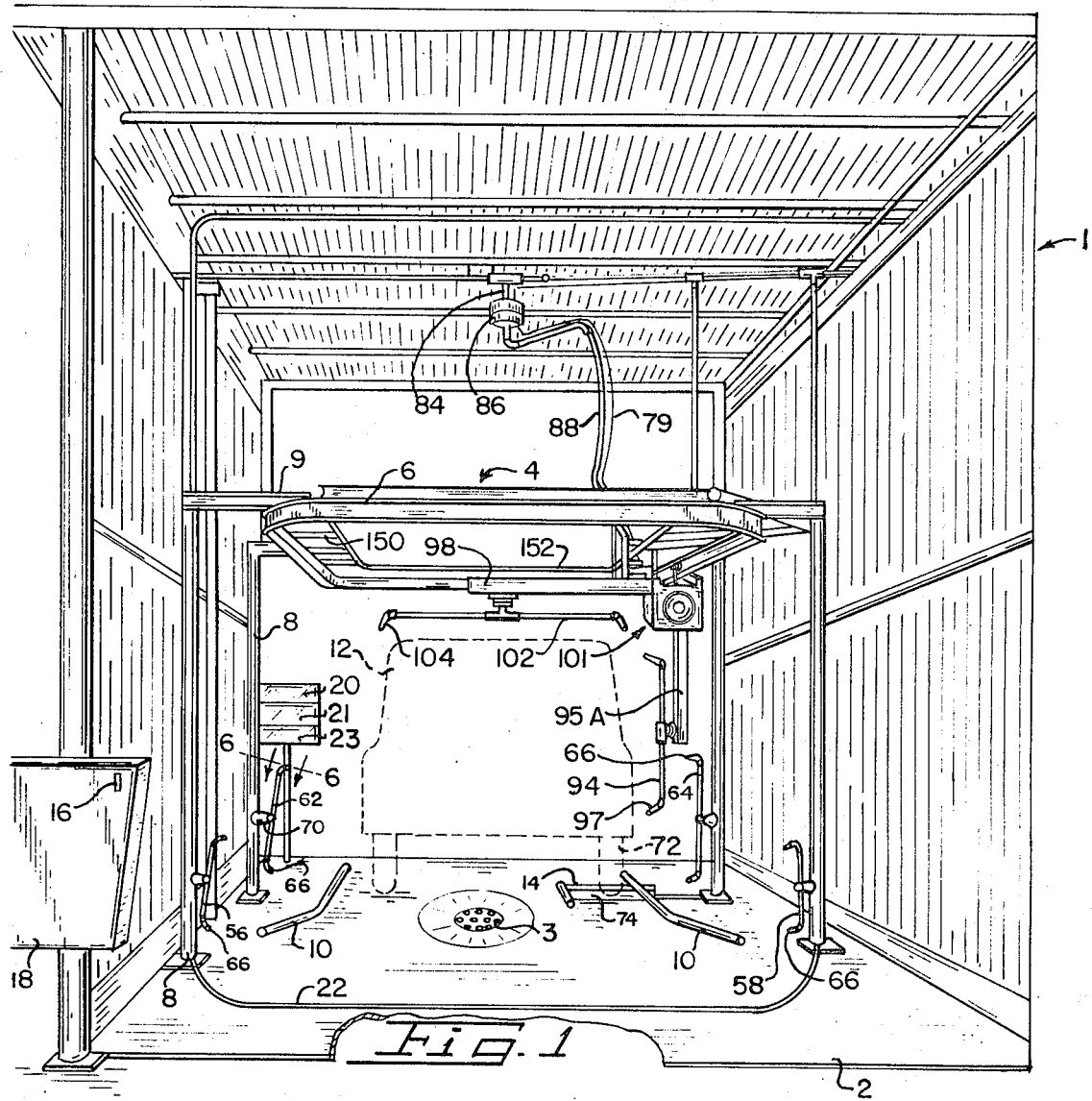
FIG. 1 is a perspective view, looking into the automated motor vehicle washing apparatus from the entrance end thereof, showing a motor vehicle therein in dashed outline, and showing a shed like building as housing the apparatus.
Figure 2:
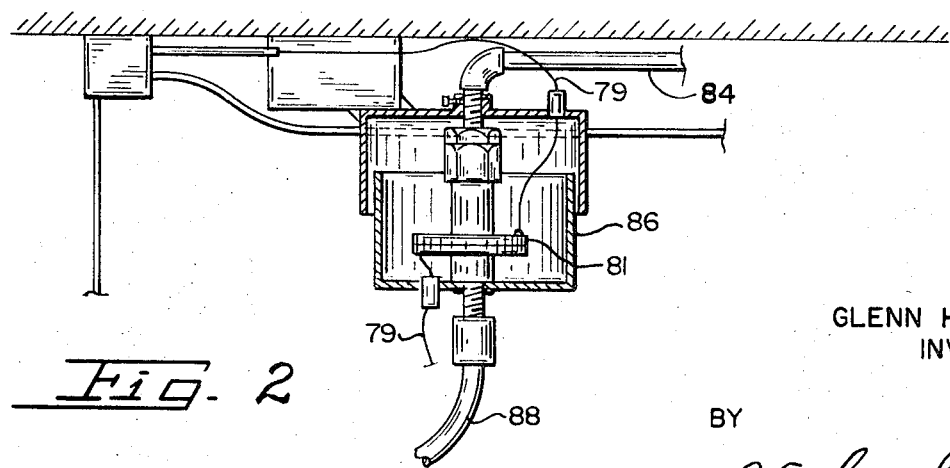
FIG. 2 is an enlarged sectional view of a rotary fluid seal, an electrical slip ring mechanism for transferring electrical current, water and solution from stationary wires and pipes in the upper portion of the building to the rotating portion of the mechanism with portions being broken away and with portions shown in section to bring out the details of construction.
Figure 5:
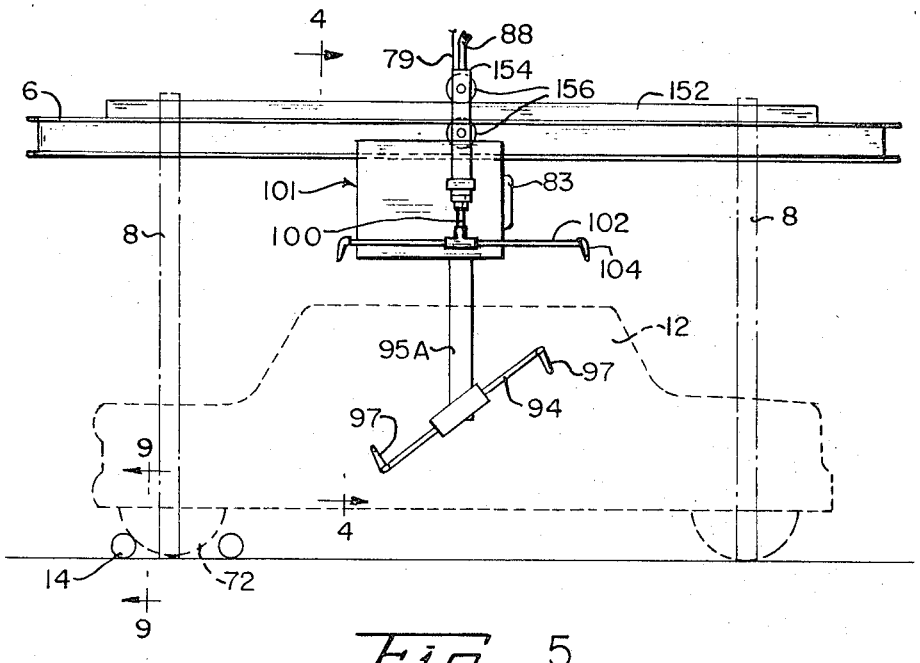
Figure 6:
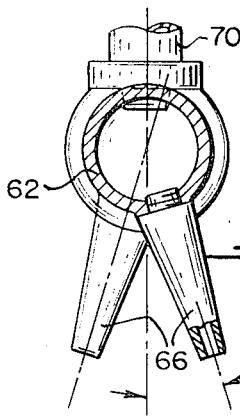
Figure 7:
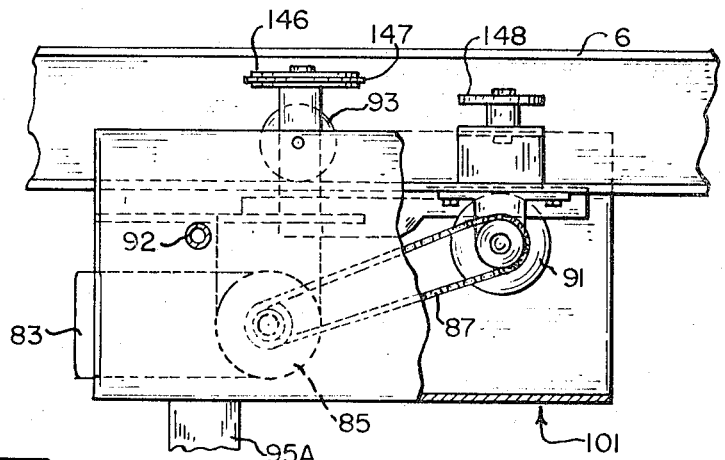

FIG 5 s a diagrammatic view showing the motor vehicle wash support track and the traveling motor vehicle wash support member, and showing a motor vehicle, in dashed outline, in position to be washed;

FIG. 6 is an enlarged sectional view taken on the line 6–6 of FIG. 1, looking in the direction indicated by the arrows, to show the representative nozzle arrangement of the whirling sprays, and showing the diverging of the nozzles on opposite ends of the whirling motor vehicle washing pipe, with parts being broken away, and with parts being shown in section;

FIG. 7 is an enlarged, fragmentary elevational view of a portion of the support track, showing the power drive mechanism supported thereon, with parts being broken away and with parts being shown in section to bring out the details of construction;

FIG. 8 is a perspective view of a portion of the support track for the washing apparatus, showing the washing apparatus thereon, and showing parts as being broken away, and parts shortened to bring out the details of construction;

FIG. 9 is an enlarged fragmentary elevational view, with parts broken away and with parts shown in section of an abutment, a pressure actuated switch, showing a resiliently supported lever associated with the switch mechanism; and FIG. 10 is a diagrammatic view of the fluid system and the electrical system, showing the switching valve and the programming control box for controlling the dispensing of water, soap, rinse solution and wax.

With more detailed reference to the drawings, the numeral 1 designates generally a building having a floor 2 and drain 3 therein. A motor vehicle washing apparatus is generally designated by the numeral 4, which has a modified rectangular loop track 6 supported on post 8 within building 1. The floor 2 has guide rails 10 to define a path of the motor vehicle 12 with an abutment 14 to properly locate motor vehicle below the circuitous track 6.

Normally, the mechanism of the automated motor vehicle laundry is coin operated by depositing one or more coins in a slot 16 within coin operated switch box 18, which activates circuit 132 and 133 to initiate the first step of a sequence programming mechanism, whereby normally, one of three illuminated signs will operate successively with the sign 20 indicating for the car to "enter" into the washing area. Upon the front wheels crossing a pressure sensitive hose 22, a delayed action pressure switch (not shown) within a circuit 22A will be closed, which switch closes circuits 27 and 119 in the programming box 24, to activate solenoid valves 26 and 118 and to close a circuit 43 to motor 44 to withdraw a soap or detergent solution from tank 28 through check valve 30 into pipe 32 and through strainer 34 into pipe 36 and into a mixing manifold 38 into pipe 40 and through high pressure pump 42 which is driven by a motor 44, and with the solenoid valve 46 in circuit 45 open and the solenoid valve 48 closed, the soap or detergent solution will be directed into pipe 50 and into branch pipes 52 and 54 to actuate rotary spray pipes 56 and 58 positioned on posts 8 near the entrance of the apparatus.

The motor vehicle will then be driven until one of the front wheels abut a member 14 on the floor 2, which will position the wheels in position to be washed by rotary sprays 62 and 64, as simultaneously with the direction of fluid into pipes 52 and 54 the solution will be directed into pipe 61 to which rotary spray pipes 62 and 64 are connected for a predetermined time due to a time delay switch in circuit 22A. The rotary spray pipes have angulated nozzles 66 thereon which will cause the spray pipes to whirl about an axis 70 which will clean the mud and the like from the wheels and from beneath the fenders in which the spray solution comes in contact.

Upon the front wheel 72 abutting with member 14, a lever 74 will be depressed against tension of spring 76 which will actuate a pressure sensitive switch 78 which will close a circuit, as indicated at 80, whereupon, the programmed control in control box 24 will close a switch (not shown) which will direct current through a circuit 47 to solenoid valve 48. Simultaneously with the car wheel engaging member 14, and depressing switch 78, an instruction light 20 will go off and an instruction light 21 will come on, which light reads "stop". With the car in this position, and with switch 78 depressed, an electrical programming switch, in control box 24, will be closed to energize circuit 79, which circuit leads through slip ring connection 81 to motor 83, which is connected to a gear reduction unit 85 to drive chain 87 which connects elastomer roller 91 in driving relation therewith. The elastomer roller 91 is urged into driving relation with the lower side of beam 6, due to the weight of motor 83 and gear reduction 85 being such as to pivot about support roller 93 to cause the elastomer roller 91 to drive the power unit, designated generally by the numeral 101 to move the unit around the circuitous, modified rectilinear track 4.

The pump 42 will direct warm water and detergent solution, under pressure, into pipe 82 and normally the solenoid valve 46 will close after a predetermined delay, then the flow of solution from pipe 40 will be directed through solenoid valve 48, and the solution, under high pressure, will be directed into pipe 84 and through a rotary seal 86 into flexible hose 88 and thence into pipe 90 with the pipe 90 connecting with a branch pipe 92 and to rotary spray unit 94, mounted on a rotary seal 95 on downwardly extending support 95A. The rotary spray unit 94 has nozzles 97 thereon which are similar to the nozzles shown in FIG. 5. Another branch pipe 96 is connected to pipe 90 which extends outward through arm 98 and is connected through a rotary seal 100 with rotating pipe 102 which has nozzles 104 thereon, which nozzles are similar to nozzles shown in FIG. 6.

With the pressure being applied by pump 42 to the solution being pumped through pipes 92 and 96, the whirling spray pipes 94 and 102 will spray a substantially circular sheet of spray onto the side of the motor vehicle adjacent whirling spray pipe 94 and over the top of the motor vehicle by whirling spray pipe 102. The spray pipe 94 is of such length that, coupled with the angulation of nozzles 97 and the divergence of the nozzles, the entire side of the motor vehicle will be acted upon with high pressure solution, which pressures are normally maintained above 600 p.s.i. The whirling spray pipe 102 mounted on arm 98 is of such length that it covers the top side of a motor vehicle each pass thereover and while the device may be arranged and programmed to make one circuitous cycle around track 6, two or four cycles, with the solution being sprayed on the motor vehicle each time substantially covers the top each time a pass is made down the longitudinal section of the track. One complete circuit or cycle of the power unit 101 will cause the whirling sprays 94 and 102 to spray the solution upon the top portion of the car twice, however, the normal cycle of operation is two cycles for washing with a detergent, one cycle for rinse water without detergent, and one cycle for waxing solution, if an additional coin has been inserted prior to starting the washing, rinsing and waxing operations, which is accomplished by solenoid valve 26 being closed by a program control in control box 24, and the water is directed from tank 108, through check valve 110, through strainer 111 into conduit 112 and into mixing manifold 38 into pipe 40 with pump 42 discharging through open solenoid valve 48 to rotating sprays 94 and 102 to spray the rinse water on motor vehicle 12. Two rinse cycles are normally used if the patron does not desire the motor vehicle waxed.

If it is desired to wax the motor vehicle, an additional coin may be inserted into the coin box 18, which will program two washing cycles with detergent, one washing cycle with clear water and one waxing cycle. When an additional coin, above the rate for washing and rinsing the motor vehicle, is inserted into coin box 18, it will cause a switch in the program control box 24 to be closed, which, at the proper time, will close circuit 120. The closing of the circuit 120 will cause solenoid valve 122 to open, which will enable wax solution to be withdrawn from tank 124, by pump 42, through check valve 125 into conduit 126 and through strainer 127 and solenoid valve 122 into conduit 128 which leads to mixing manifold 38, whereupon, simultaneously, water will be withdrawn from tank 108 through conduit 112 into mixing manifold 38. Furthermore, simultaneously with closing circuit 120, a circuit 134 will be energized by the closing of a switch in the program control box 24, which will open solenoid valve 136 to enable a rinse and quick drying solution to be withdrawn from tank 138 through check valve 140, strainer 142 into conduit 143 and through open solenoid valve 136 into conduit 144 to be mixed with water and wax solution in mixing manifold 38.

It is to be pointed out that the control box 24 has an electrical power source 130 leading thereto and all operating circuits lead therefrom and are operated by a programming mechanism which, in conjunction with circuits 132 and 133 that lead from the coin box and circuit 80 that leads from pressure switch 78 and circuit 22A that leads from a delayed action switch (not shown), which switch is operated by a pressure sensitive hose 22, to cause the programming mechanism in control box 24 to function in proper sequence.

The power unit 101 is suspended, by support rollers 93, from the lower webb of I-beam support track 6, with guide rollers 146 and 148 on each side of the webb of the I-beam support track 6 to maintain the power unit 101 in guided relation thereon to be driven by drive roller 91. The downwardly extending support 95A is rigidly secured to the power unit 101 for movement therewith, which support 95A has a pipe 92 extending downwardly therethrough to a point near the lower end thereof, which pipe 92 is connected in fluid communication with the rotary fluid seal 95 to supply a liquid to whirling spray 94, which is journaled thereon, so the liquid sprayed therefrom will act on the portion of the motor vehicle adjacent thereto, which liquid is normally water and detergent, water, or water mixed with a rinsing solution and wax.

Figure 3:
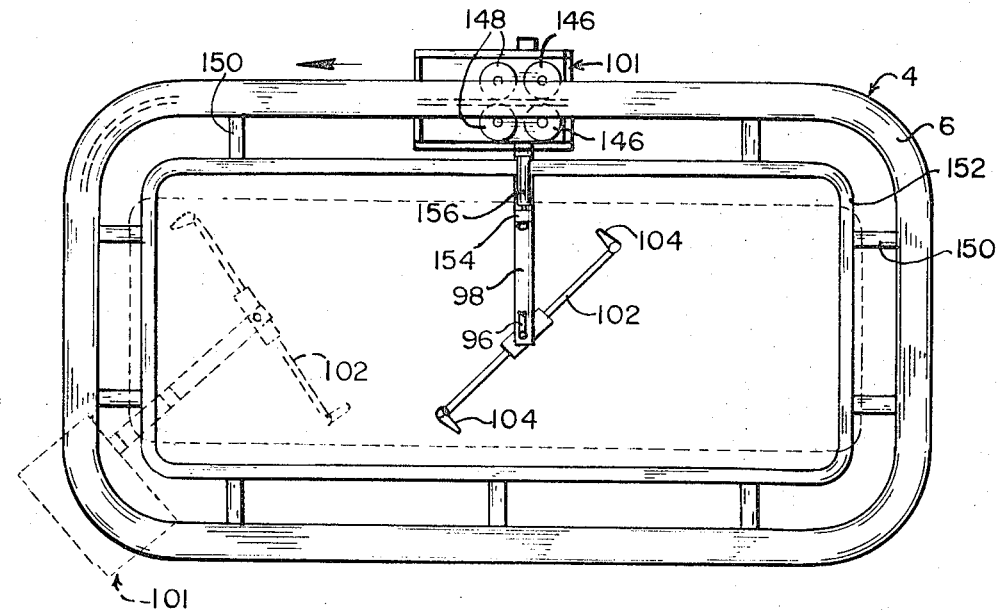
FIG. 3 is a top plan view of the modified rectilinear closed loop support track, showing the traveling spray element thereon in full outline in one position and in dot-dash outline in another position.
Figure 4:
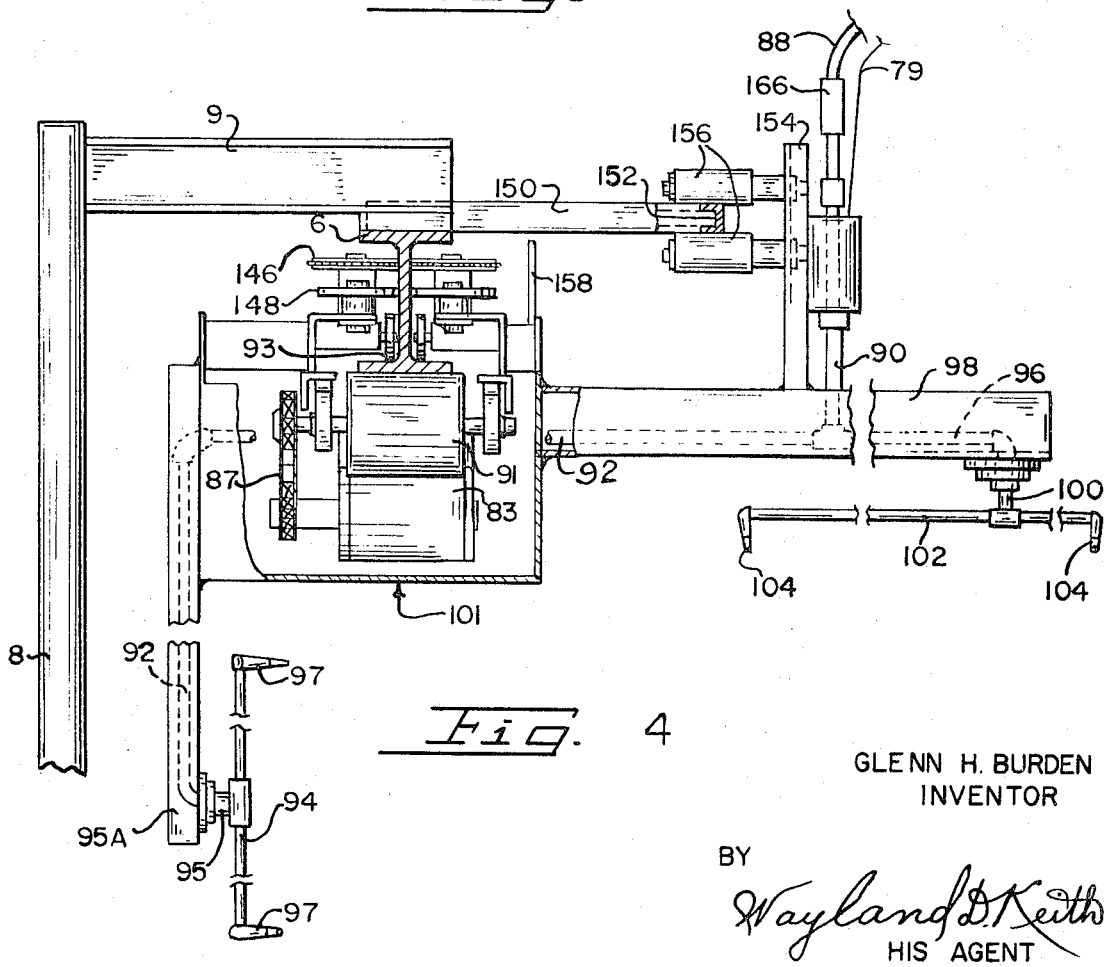
FIG. 4 is an enlarged sectional view taken on the line 4–4, of FIG. 5, looking in the direction indicated by the arrows, with parts being broken away and with parts being shortened and with parts being shown in elevation to show the details of construction.

The I-beam support track 6 has support arms 150 secured to the upper face thereof, which arms extend inward to support a second track 152 in substantially parallel relation with I-beam support track 6, as will best be seen in FIG. 3. The outwardly extending arm 98 is secured to power unit 101, which arm 98 has an upstanding support member 154 thereon, which support member has second support rollers 156 journaled thereon and extending horizontally outward to engage the upper and lower faces of a channel of the second track 152 to support outwardly extending arm 98. The rollers 156 travel in unison with power unit 101 and maintain the outwardly extending arm 98 in a horizontal position at all times, which arm has spray 102 journaled thereon to dispense a liquid therefrom throughout the circuit of travel, as the second support rollers 156 are of sufficient length to navigate the four curves on the modified, rectilinear channel track 152.

When the motor vehicle initially enters the washing station beneath the modified rectilinear channel track 152, the power unit 101 is positioned to one side of the motor vehicle. Upon switch 78 being depressed, an electrical circuit is closed to motor 83 to drive the power unit 101 around the support track 6 to the original station and an upstanding abutment 158 is engaged by an arm 160 of switch 162, which will transmit an electrical signal through circuit 164 to program control box 24. Each time the power unit 101 makes a cycle of track 6, the program mechanism in the program control box 24 is actuated. During the first two cycles, however, a detergent solution is supplied to rotating sprays 94 and 102 to wash the motor vehicle, but the third time the switch arm 160 engages the abutment 158, it causes the program mechanism in program control box 24 to switch from detergent solution to water by closing a solenoid valve 26, which permits water to be drawn directly from the tank 108 through conduit 112 into mixing manifold 38, thence into and through conduit 40, in the manner hereinbefore set out to rinse the motor vehicle. When the rinse cycle has been completed, the abutment 128 engages arm 160 which causes solenoid valves 122 and 136 to be opened to direct wax solution from tank 126 and a rinse and drying solution from tank 138 into the mixing manifold 38, as hereinbefore set out, onto the motor vehicle. However, when the mixing operation of the motor vehicle is completed and the abutment 158 engages switch arm 160, the circuit 164 is opened, which will cause the electricity being directed to motor 83 to be shut off by opening circuit 79, whereupon, solenoid valve 48 will be closed and an "exit" light, on indicator 23, will be illuminated.

The opposed pairs of guide rollers 146 have yieldable, resilient facings 147 thereon, which permits the yielding of guide rollers 146 to navigate the curves between straight lengths of support track 6, as the power unit 101 moves therearound.

A second rotary fluid seal 166 is positioned on the upper end of pipe 90 and has flexible hose 88 connected thereto, which hose is of sufficient length to permit the power unit 101 to travel the circuitous track 6, while passing liquid, under pressure, to the rotary seal 166 and to sprays 94 and 102.

While the electrical circuits have been indicated throughout by a single line for each circuit, it is to be understood that each electrical circuit line, illustrated diagrammatically, includes dual electrical conductors and the use of this type of diagrammatic illustration is to simplify the showing in the drawing.

The motor vehicle is now ready to be moved outwardly over abutment 14, then the depressed lever 74 will be raised by spring 76 to permit the opening of switch 78, which resets the programming mechanism, which mechanism is reactivated, either by dropping two coins into slot 16 of coin box 18, for a wash and rinse, or three coins may be inserted into the coin box, for wash, rinse, and wax cycles, as set out above.

I claim:
1. A self-service, automated motor vehicle washing apparatus associated with a floor comprising:
   a. upstanding spaced supports on the floor;
   b. a modified rectilinear loop track associated with said upstanding supports to support said track in a position to be above a motor vehicle and to be substantially horizontal;
   c. a power unit mounted on said track for movement therealong;
      1. a support roller mounted on said power unit, intermediate the length thereof, and engaging said track, with the axis of said roller lying in a plane passing transversely through said track, to at least partially support said power unit;
      2. a motor supported on said power unit, to one side of said plane passing transversely through the axis of said roller;
      3. a drive roller mounted on said power unit, the axis of which drive roller is parallel to the axis of said support roller and being on the opposite side of said transverse plane passing through the axis of said support roller and being in frictional engagement with said track;
   4. said motor being connected in driving relation with said drive roller to move said power unit along said track;
   5. a source of power connected to said motor;
   d. a support secured to said power unit and extending downwardly therefrom;
   e. a rotating spray journaled near the lower end of said downwardly extending support;
   f. an outwardly extending arm secured to said power unit;
   g. a rotating spray journaled on said outwardly extending arm near the outer end thereof;
   h. a first conduit connected to said spray on said downwardly depending support and to said spray on said outwardly extending arm;
      1. a first rotary fluid seal;
      2. said first conduit being connected with said first rotary fluid seal near the upper end thereof;
   i. a pump means for supplying liquid under pressure to said conduits;
   j. a second conduit connected to said first rotary fluid seal for supplying a liquid under pressure from said pump means of liquid pressure to said first conduit.

2. A self-service, automated motor vehicle washing apparatus, as defined in claim 1, wherein said drive roller is held in frictional engagement with said track by the weight of said power unit on the opposite side of the axis of said support roller so as to pivot thereabout to urge said drive roller into frictional engagement with said track.

3. A self-service, automated motor vehicle washing apparatus, as defined in claim 1, wherein a pair of guide rollers are mounted on said power unit, on vertical axes in opposed contact relation with respect to said support track to maintain said power unit in guided relation with respect to said support track.

4. A self-service, automated motor vehicle washing apparatus, as defined in claim 3, wherein one pair of said guide rollers each has a resilient facing thereon to permit limited yielding of said rollers with respect to said track, when said guide rollers pass around curves in said support track.

5. A self-service, automated motor vehicle washing apparatus, as defined in claim 1, wherein:
   a. a second horizontal track is spaced inward from said support track and is supported in rigid relation with respect thereto;
   b. an upstanding support member associated with said power unit;
   c. a pair of second support rollers mounted on vertically spaced apart horizontal axes journaled on said upstanding support member associated with said power unit; and
      1. the axes of said second support rollers being substantially parallel and on opposite horizontal sides of said second track and lying in a plane passing transversely through said support track, with said second support rollers supporting said outwardly extending arm which is secured to said power unit.

6. A self-service, automated motor vehicle washing apparatus, as defined in claim 1, wherein:
   a. said rotating spray, journaled on said outwardly extending arm for movement above the motor vehicle, has angulated nozzles near the outer end thereof, which will cause the spray to rotate about the axis thereof upon application of pressurized liquid thereto; and
      1. said spray being of a length so that the liquid emitted from the nozzles thereof will cover the entire upper outer surface of the motor vehicle each lineal pass thereover.

7. A self-service, automated motor vehicle washing apparatus, as defined in claim 1, wherein:
   a. a second rotary fluid seal is positioned in close proximity to said outwardly extending arm within said first conduit; and
   b. a flexible conduit connects said first rotary fluid seal and said second rotary fluid seal in fluid communication.

8. A self-service, automated motor vehicle washing apparatus, as defined in claim 1, wherein:

a. a liquid supply conduit connected to said pump means;
  1. an electrically controlled valve associated with said conduit;
b. rotating sprays are mounted on said upstanding supports, on the floor, a spaced distance thereabove, which sprays are connected in fluid communication with said liquid supply conduit so the liquid directed from said conduit to said sprays, under pressure, will act on the wheels of the motor vehicle;
c. an electrical circuit; and
d. a time delay switch within said electrical circuit connected to said valve which is a liquid supply conduit,
  1. said switch being activated by a wheel of the motor vehicle moving thereby, to open said valve to divert liquid under pressure to said sprays to direct liquid under pressure onto the wheels of said motor vehicle for a predetermined time after said time delay switch has closed said electrical circuit.

9. A self-service, automated motor vehicle washing apparatus, as defined in claim 8, wherein an abutment is positioned on said floor to be engaged by one of the wheels of the motor vehicle, to position said wheels in an area so as to be acted on simultaneously by the liquid being discharged under pressure from said sprays on said supports.

10. A self-service, automated motor vehicle washing apparatus, as defined in claim 1, wherein:
a. an abutment is positioned on the floor to locate the motor vehicle within an area to be acted upon by liquid being discharged under pressure by said sprays;
  1. a pressure actuated switch associated with said abutment, which switch is closed when one of the wheels of the motor vehicle engages said abutment on the floor;
b. a first electrical circuit;
c. an abutment mounted on said power unit;
d. a switch associated with said support track in position to be engaged by said abutment on said power unit when said power unit moves by a predetermined point on said support track,
  1. said switch on said support track being connected within a second electrical circuit;
  2. said first electrical circuit associated with said pressure actuated switch is associated with said abutment on the floor, also being associated with said second electrical circuit with said switch on said support track; and
  3. said power unit adapted to be activated upon closing of said pressure switch adjacent said abutment and to move along said track in a circuitous path when the abutment on the power unit engages said switch associated with said support track, so as to selectively change cycles of washing with detergent, rinsing with clean water, and applying a wax solution to the motor vehicle in coordination with a programming control, so upon engagement of said abutment with said switch on said support track a predetermined number of times, said switch will be inactivated until the pressure switch associated with said abutment on the floor is opened.